United States Patent Office 3,147,297
Patented Sept. 1, 1964

3,147,297
TRANSESTERIFICATION OF ARYL SUBSTITUTED PHOSPHITE TRIESTERS WITH ALIPHATIC MERCAPTANS
Ingenuin Hechenbleikner, Cincinnati, Ohio, assignor to Hooker Chemical Corporation, Niagara Falls, N.Y., a corporation of New York
No Drawing. Filed Dec. 5, 1960, Ser. No. 73,543
19 Claims. (Cl. 260—461)

This invention relates to the elimination of at least one aryl group from an aryl-substituted tertiary phosphite or tertiary thiophosphite by transesterification with at least one aliphatic mercaptan to form organic thiophosphites containing at least one more thiophosphite linkage than the starting material.

Organic thiophosphites have been used extensively as chemical intermediates, as additives for hypergolic fuels, as stabilizers for polyolefines, as additives for lubricants, as cotton defoliants, and for numerous other purposes.

In "Organo Phosphorus Compounds," by Kosolapoff, page 183, it is disclosed that trialiphatic or triaromatic trithiophosphites may be prepared by heating an aliphatic thiol or aromatic thiol with phosphorus trichloride. However, product yields are very low when such a procedure is followed.

It is an object of this invention to provide an improved and more economical method of preparing organo thiophosphites.

Another object of the invention is to provide an improved and more economical method of preparing monoaryldialkyldithiophosphites.

Still a further object of the invention is to provide an improved and more economical method of preparing diarylmonoalkylmonothiophosphites.

It is another object of the invention to provide an improved and more economical method of preparing trialiphatic trithiophosphites.

A further object of the invention is to provide an improved and more economical method for preparing trilauryltrithiophosphite.

Still another object of the invention is to provide a method of producing organothiophosphites in improved yield and purity.

These and other objects of the invention will be apparent from the following detailed description.

It has now been discovered that one or more aryl groups can be eliminated from an aryl-substituted trivalent ester of phosphorous acid compound selected from the group consisting of triaryl phosphites, diaryl alkyl phosphites, aryl dialkyl phosphites, aryl alkylene phosphites, diaryl alkyl monothiophosphites, aryl dialkyl dithiophosphites, and aryl alkylalkyl monothiophosphites by transesterification thereof with an aliphatic mercaptan in the presence of a basic catalyst to form thiophosphites containing at least one more thiophosphite linkage than the starting material. Halogen substituted tertiary phosphites and tertiary thiophosphites may also be employed.

Typical examples of suitable trivalent esters of phosphorous acid that can be employed are triphenyl phosphite, tricresyl phosphite, tri-2,4-xylyl phosphite, tris(nonyl phenyl) phosphite, tris(octyl phenyl) phosphite, phenyl cresyl(nonyl-phenyl) phosphite, tris(butyl phenyl) phosphite, phenyl dicresyl phosphite, diphenyl cresyl phosphite, phenyl cresyl chlorophenyl phosphite, diphenyl-p-fluoro phenyl phosphite, tris(2,4,5-trichlorophenyl) phosphite, tris(meta-bromophenyl) phosphite, diphenyl p-iodo phenyl phosphite, O,O-diphenyl butyl monothio phosphite, O-phenyl dibutyl dithio phosphite, O-cresyl ethylene dithio phosphite, O-phenyl-O-decyl butyl thiophosphite, phenyl didecyl phosphite, phenyl ethylene phosphite, phenyl propylene phosphite, phenyl 2,3-butylene phosphite, cresyl hexylene phosphite, O-phenyl-O-butyl benzyl monothio phosphite, O-phenyl dibenzyl dithio phosphite, p-chlorophenyl dibutyl phosphite, meta-trifluoro phenyl-didecyl phosphite, phenyl diallyl phosphite, diphenyl methallyl phosphite, and mixtures thereof.

Any primary or secondary aliphatic mercaptan or mixtures thereof may be employed as a reactant. Suitable primary alkyl mercaptans include methyl, ethyl, butyl, propyl, amyl, hexyl, octyl, nonyl, decyl, lauryl, cetyl, octadecyl, stearyl and benzyl mercaptans or mixtures thereof. Suitable dithiols include ethanedithiol, propane-1,2-dithiol, butylene-2,3-dithiol, propane-1,3-dithiol, hexane-1,6-dithiol and mixtures thereof. Typical examples of aryl-substituted-alkyl mercaptans and heterocyclic mercaptans include para-nitrobenzyl mercaptan, phenylethyl mercaptan and furfuryl mercaptan. Suitable alkenyl mercaptans include allyl mercaptan, methallyl mercaptan, crotyl mercaptan (1-butene-4-thiol), and mixtures thereof.

A basic catalyst is admixed with the aryl-containing trivalent phosphite and aliphatic mercaptan reactants prior to and/or during the reaction. Suitable basic catalysts include the alkali metals, alkali metal hydrides, alkali metal sulfides and mixtures thereof. For example, sodium, potassium, lithium, sodium hydride, potassium hydride, lithium hydride, sodium sulfide, potassium sulfide, lithium sulfide and mixtures thereof may be employed as the basic catalyst. The basic catalyst is added in a catalytic proportion, for example between about 0.05 and about 5.0, and preferably between about 0.1 and about 1.5 percent by weight of the aryl-containing trivalent phosphite. However, lesser or greater proportions may be employed if desired. It has been found that when the transesterification reaction is carried out in the presence of a basic catalyst, the reaction rate is increased, the product yield is increased, and the proportion of impurities in the product is markedly reduced.

Any convenient order of mixing of the reactants with the catalyst may be employed. For example, in one modification the basic catalyst is admixed with the aliphatic mercaptan and the resulting mixture is then added to the phosphite. In another modification, a mixture of the phosphite and basic catalyst is prepared and then added to the aliphatic mercaptan. If desired, the two reactants and the basic catalyst may be added simultaneously to the reaction zone.

The product obtained in the instant novel transesterification reaction depends upon the type of reactants and the proportions of reactants. Typical transesterification reactions within the scope of this invention are illustrated by the following equations:

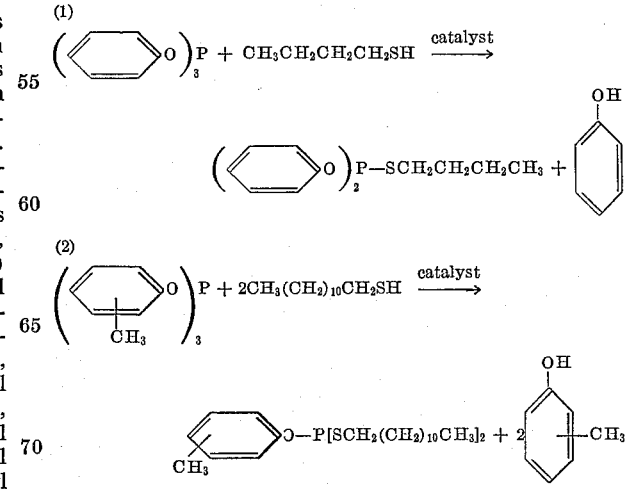

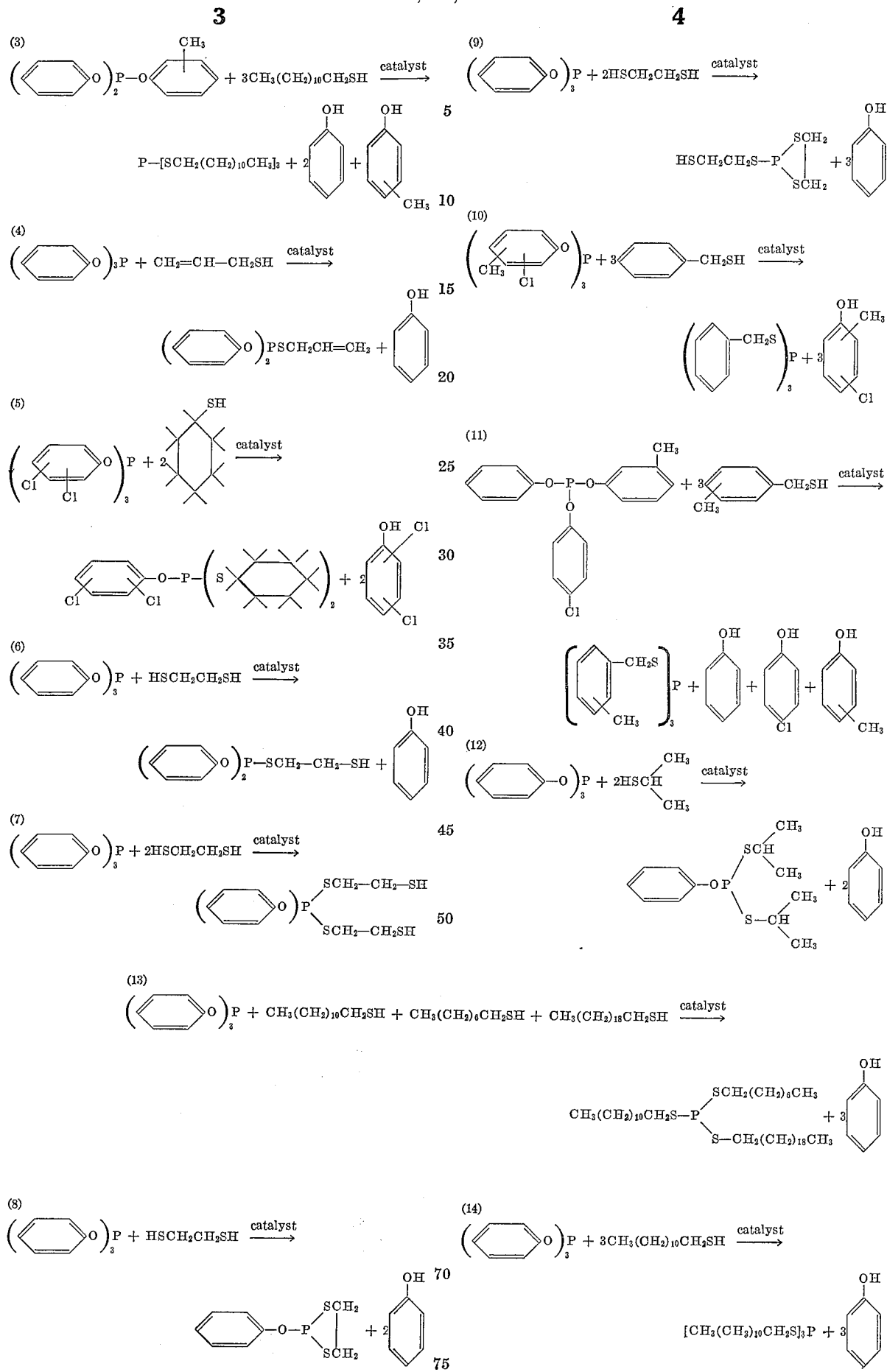

(15)
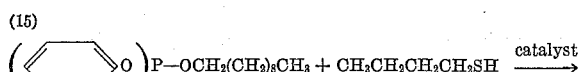
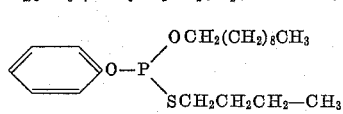

(16)
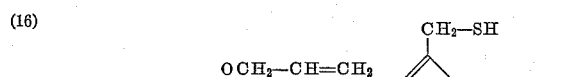

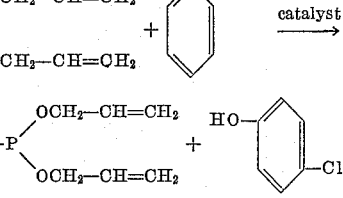

(17)
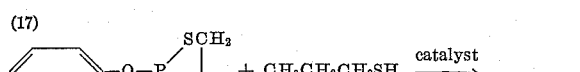

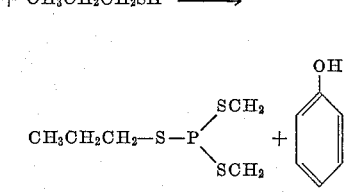

(18)
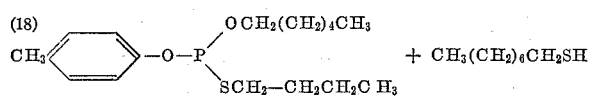

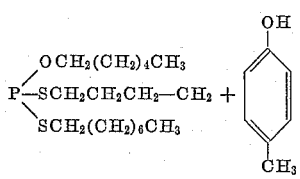

(19)
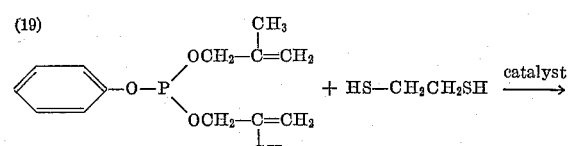

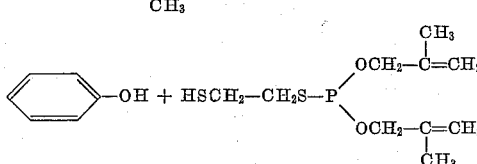

(20)
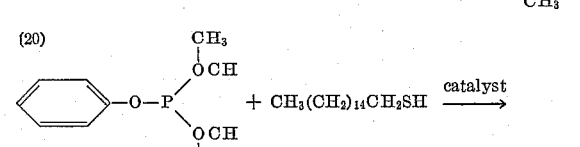

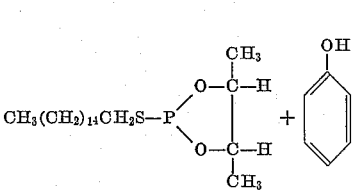

As indicated by the above equations, it is possible to replace one, two, or three of the aryl radicals of the phosphite with one or more aliphatic radicals from the mercaptan. The molar ratio of aliphatic mercaptans to triaryl phosphites employed in the reaction may vary, depending upon the type of product desired.

For example, if it is desired to obtain a product predominating in diarylmonoaliphatic monothiophosphite from a triaryl phosphite and a monothiol, or a product predominating in O-aryl cyclic alkylene phosphorodithioite from a triaryl phosphite and a dithiol, a molar ratio of the appropriate mercaptan to phospite of at least about 0.8:1 and preferably at least about 1:1 is employed. Similarly, if it is desired to obtain a product predominating in monoaryldialiphaticdithiophosphite from a triaryl phosphite and a monothiol, or a product predominating in mercaptoalkyl cyclic alkylene phosphorotrithioite from a triaryl phosphite and a dithiol, a molar ratio of the appropriate mercaptan to phosphite of at least about 1.8:1 and preferably at least about 2:1 is employed. When a product predominating in trialiphatictrithiophosphite is desired, a molar ratio of mercaptan to phosphite of at least about 2.8:1, and preferably at least about 3:1, is employed. In these reactions, a stoichiometric excess of mercaptan up to about twenty percent of the stoichiometric proportion is generally sufficient to effect the desired reaction, but greater proportions may be employed if desired.

The reaction is carried out at room temperature or below, or, if desired, the reaction mixture can be heated to remove either the phenolic product generated or the thiophosphite product, whichever has the lower boiling point. Thus, temperatures between about zero degrees centigrade and about one hundred and eighty degrees centigrade, and preferably between about seventy and about one hundred and fifty degrees centigrade may be employed.

Sub-atmospheric, atmospheric or super-atmospheric pressures may be employed, the most suitable pressure conditions depending on the nature of the reactants. For example, if methyl mercaptan is reacted with triphenyl phosphite to form trimethyltrithiophosphite, the reaction is preferably carried out at super-atmospheric pressure. However, sub-atmospheric pressures are preferably employed when a high boiling aliphatic mercaptan such as lauryl mercaptan is employed as the mercaptan reactant.

The reaction time varies with the nature of the reactants, the catalyst concentration, the temperature, the pressure, and the products desired. Completion of the reaction is generally effected in between about one-half and about twelve hours, but preferably between about one and about eight hours when lauryl mercaptan is reacted with triphenyl phosphite at a temperature of about one hundred degrees centigrade.

After the reaction is completed, or if desired, while the reaction progresses, the reaction mass is heated to distill off either the thiophosphite product or the phenolic product generated, whichever has the lower boiling point. If high boiling thiophosphites are recovered in the pot residue, the residue may be cooled to effect crystallization of catalyst and other impurities, and then subjected to a solids-liquid separation step, such as filtration, to remove the solid impurities.

The following examples are presented to define the invention more fully without any intention of limiting the invention thereby. All parts and percentages are by weight unless otherwise specified.

Example 1.—Trilauryl Trithiophosphite

Lauryl mercaptan (one hundred and twenty grams, 0.6 mole), triphenyl phosphite (sixty-two grams, 0.2 mole), and sodium hydride (0.5 gram), were admixed and heated in a flask provided with a distillation column at a pressure of ten millimeters of mercury. When the pot temperature reached one hundred and ten degrees centigrade, phenol began to distill off, and after the temperature reached one hundred and eighty degrees centigrade, fifty grams of phenol were recovered. The pot residue was cooled and filtered to produce a colorless liquid, which weighed one hundred and thirteen grams. This product had a refractive index at twenty-three degrees centigrade of 1.50446.

This product was added to a five-liter flask, along with lauryl mercaptan (nine moles), triphenyl phosphite (three moles), and sodium hydride (five grams). The flask, which was provided with a distillation column, was heated to a pot temperature of one hundred and ten degrees centigrade for one hour. Seven hundred and thirty grams of phenol were removed by vacuum distillation, then additional lauryl mercaptan (three hundred and seventy-six grams), was added to the pot and the resulting mixture was heated under vacuum to remove substantially all of the phenol and excess mercaptan. The pot residue was cooled to one hundred and forty degrees centigrade, admixed with filter aid, and filtered. Infrared analysis of the resulting trilauryl trithiophosphite showed only a slight trace of phenyl groupings present.

Example 2.—Trioctyl Trithiophosphite

One mole of triphenyl phosphite (three hundred and ten grams), was charged into a two-liter, round-bottom flask equipped with a thermometer, nitrogen ebullator, an adiabatic distillation column (twelve inches long by one-half inch in diameter), packed with one-eighth inch glass helices. The distillation column was fitted with a K distillation head, two condensers, a five hundred milliliter cooled receiver which was connected to two Dry Ice traps, a marrometer, and a mechanical vacuum pump. One gram of sodium metal was dissolved in seven hundred and fifty-seven grams of n-octyl mercaptan (4.5 moles, fifty percent stoichiometric excess), and this solution added to the triphenyl phosphite in the pot. The pressure was reduced to about twelve millimeters of mercury, and sufficient heat was applied to hold the pot at sixty-five to ninety degrees centigrade during distillation. Distillation was continued for one and one-half hours, and four hundred and thirty-four grams of distillate were removed which contained twenty-two percent phenol (95.5 grams of phenol). Four hundred and thirty-four grams of fresh n-octyl mercaptan was reacted with another gram of sodium and added to the pot. This was heated for three hours and the distillation continued for six more hours at a pot temperature of from seventy-eight to one hundred and ten degrees centigrade. Distillate recovered during this time weighed three hundred and ninety grams and contained one hundred and fifty-six grams phenol (forty percent). An additional two hundred and twenty grams of n-octyl mercaptan were added, and the distillation continued for six hours at pot temperatures from ninety-seven to one hundred and four degrees centigrade. One hundred and twelve grams of distillate were recovered which contained twenty-five grams of phenol or 22.5 percent. The distillation pressure was maintained at thirteen millimeters Hg, and the head temperature varied between seventy-five and eighty-one degrees centigrade. To remove the last traces of the excess mercaptan the pressure was reduced to between 0.3 and 0.85 millimeter Hg, and the distillation continued at a pot temperature of from ninety-two to one hundred and fifty degrees, and a head temperature which ranged from sixty to one hundred degrees centigrade. In this stripping operation three hundred and twenty grams of distillate were recovered, consisting essentially of pure n-octyl mercaptan (99.9 percent pure). The material remaining in the pot was filtered to remove any sodium or sodium phenate and then five percent by weight Attapulgus clay was added and agitated with the product. This was filtered to yield a water white product. Chemical analyses of the product showed 20.6 percent S (theory, 20.6), and 6.28 percent P (theory, 6.6 percent). The product yield was four hundred and thirty-two grams or 92.5 percent.

Example 3.—Trilauryl Trithiophosphite From Tricresyl Phosphite

In the same equipment used in Example 2, one mole of tricresyl phosphite (three hundred and fifty-two grams) was mixed with a solution of 3.6 moles of dodecylmercaptan (tweny percent stoichiometric excess), and one gram of sodium. The pressure was reduced and the distillation of cresol started. The first distillate was taken after six and one-half hours of distillation at a pot temperature of ninety-four to one hundred and seventy degrees centigrade, and head temperature of ninety-two to one hundred and twenty-two degrees centigrade, at a pressure of from eight to thirteen millimeters Hg. The pressure was then reduced to one millimeter Hg, and the pot temperature raised to two hundred and ten degrees centigrade with the head temperature varying between one hundred and seven and one hundred and fifteen degrees centigrade. The pot material was treated with five percent Attapulgus clay and filtered yielding six hundred and thirty-three grams of trilauryl trithiophosphite, or 97.3 percent of the theoretical yield.

Example 4.—O-Phenyl Dibenzyl Dithiophosphite

In the same equipment as used in Example 2, three hundred and ten grams of triphenyl phosphite (one mole), were mixed with 4.5 moles benzyl mercaptan, (five hundred and fifty-nine grams), and one gram of sodium hydride. The catalyst was mixed with the mercaptan before addition to the triphenyl phosphite, as in Example 2. The pressure was reduced to eleven millimeters Hg and the pot materials allowed to reflux for four hours at eighty-five to ninety-five degrees centigrade. Distillation was carried out at a pressure of ten millimeters of mercury, with a pot temperature varying between one hundred and one and one hundred and eighty degrees centigrade, and the head temperature varying between forty and seventy-three degrees centigrade. Five percent Attapulgus clay was added and after agitation for one-half an hour, the pot material filtered to yield a light yellow liquid containing 18.7 percent sulfur (theory, 17.7 percent S).

Example 5.—Trilauryl Trithiophosphite

Ten grams of dry sodium sulfide were added to 3.6 moles dodecyl mercaptan (seven hundred and forty-nine grams), and this solution added to one mole triphenyl phosphite (three hundred and ten grams), in the same equipment used in Example 2. The pot was heated for two hours at ten millimeters Hg, from seventy-five to one hundred and twenty-eight degrees centigrade before distillation of the phenol started. The phenol and excess mercaptan were removed as before by a distillation lasting five hours with the final conditions of a pot temperature of two hundred degrees centigrade, head temperature of one hundred and fourteen degrees centigrade at 0.6 millimeter Hg. The pot residue was treated with five percent Attapulgus clay and filtered to recover trilauryl trithiophosphite in a proportion equivalent to eighty-seven percent of theoretical yield.

Example 6.—Tribenzyl Trithiophosphite

In the same equipment as used in Example 2, one mole of triphenyl phoshite were mixed with six moles of benzyl mercaptan (one hundred percent stoichiometric excess—seven hundred and forty-five grams), and one gram of sodium hydride. The pressure was reduced and the mixture refluxed for eight hours at thirteen millimeters Hg, at eighty to eighty-five degrees centigrade. Distillation of the phenol and excess mercaptan was then carried out for eleven hours at eleven millimeters Hg, pot temperature of seventy-eight to one hundred and forty-five degrees centigrade and head temperature of fifty-one to sixty-eight degrees centigrade. Two hundred grams of mercaptan and one gram of sodium hydride were then mixed with the pot material, and the heat was applied for four additional hours. Distillation of excess mercaptan resulted in theoretical phenol recovery. Final stripping conditions were one hundred and ninety degrees centigrade pot temperature, one hundred degrees centigrade head temperature at 0.13 millimeter Hg. The product was a very viscous liquid which had to be warmed to be treated with five percent Attapulgus clay and filtered. The light yellow product contained 24.1 percent sulfur (theory, 24.0 percent) and was recovered in ninety-one percent yield.

*Example 7.—Trilauryl Trithiophosphite*

In the same equipment used in Example 2, three hundred and ten grams triphenyl phosphite were mixed with seven hundred and forty-nine grams of dodecyl mercaptan (3.6 moles), and two grams of potassium metal. Distillation of the phenol and excess mercaptan was carried out in the same manner as in the other examples at eleven millimeters Hg pressure, one hundred and five to one hundred and ninety-five degrees centigrade pot temperature and seventy-nine to one hundred and twenty-three degrees centigrade head temperature over a period of seven hours. Five percent Attapulgus clay was added and the product filtered. The water-white trilauryl trithiophosphite was recovered in ninety-seven percent yield, and had a purity of greater than ninety-five percent.

*Example 8.—Tri-Isopropyl Trithiophosphite*

In the same equipment used in Example 2, one mole of triphenyl phosphite (three hundred and ten grams), was mixed with a solution of one gram of sodium metal in three hundred and eighty-one grams of isopropyl mercaptan (five moles—sixty-six percent stoichiometric excess). At atmospheric pressure the reactants were refluxed for eight hours at sixty to sixty-three degree centigrade pot temperature, fifty-two degrees head temperature. The distillation was carried out also at atmospheric conditions due to the low boiling point of the isopropyl mercaptan. In the distillation, three hundred and fifty-four grams of the mercaptan was recovered. The pressure was reduced and twenty-one grams of phenol distilled off. This represented 7.3 percent of theoretical. A second distillation cut taken at one hundred and sixty-five degree centigrade pot temperature, one hundred and forty-seven degree centigrade head temperature at 0.15 millimeter Hg was a clear water-white liquid containing 26.1 percent S (theoretical sulfur for the O, phenyl, diisopropyl dithiophosphite=23.4 percent).

*Example 9.—Trilauryl Trithiophosphite*

In the same equipment used in Example 2, five hundred and seventeen grams (one mole) tri-2,4-dichlorophenyl phosphite were mixed with a solution of one gram sodium hydride in seven hundred and forty-seven grams lauryl mercaptan (3.6 moles). Pressure was reduced to fourteen millimeters Hg, and heat applied for four hours before the dichlorophenol was distilled off the reaction mixture. This distillation was carried out at a head temperature of ninety to ninety-three degrees centigrade, at eleven millimeters Hg, over a period of nine hours, with the final conditions being one hundred and ninety degrees centigrade pot temperature, one hundred and thirty degrees centigrade head temperature, at two millimeters Hg pressure. The material remaining in the pot was treated with one percent Attapulgus clay and filtered. The product yield was ninety-five percent, and had greater than ninety-five percent purity.

*Example 10.—Reaction of Triphenyl Phosphite and Ethane Dithiol*

In the same equipment used in Example 2, three hundred and ten grams triphenyl phosphite (one mole), and ninety-four grams ethane dithiol (one mole), were mixed with one gram NaH. The reactants were heated to one hundred and seventy-eight degrees centigrade at atmospheric pressure for about one hour. The pot was then cooled and vacuum applied. At a pressure of twelve millimeters Hg, pot temperature of sixty to ninety-two degrees centigrade and a head temperature of forty-five degrees centigrade, approximately thirty grams of mercaptan were distilled off. The head temperature rose to seventy-seven degrees centigrade and phenol distilled off until one hundred and nine grams of phenol had been recovered. Distillation was stopped and thirty grams of ethane dithiol were added. Pressure was reduced and distillation again started with phenol distilling off once again. Final conditions of the distillation pot were one hundred and eighty degrees centigrade, at two millimeters Hg. After completion of the distillation, the pot residue was heated to one hundred and twenty degrees centigrade, Attapulgus clay was added, and the slurry was filtered.

The clarified filtrate, upon cooling to room temperature, partially solidified to form a slurry which was filtered. Chemical analysis of the solid thiophosphite product indicated a sulfur content of 40.1 percent.

*Example 11.—O,O,-Diphenyl Tert. Octyl Thiophosphite*

For purposes of comparison an attempt was made to prepare O,O-diphenyl tertiary octyl thiophosphite by reacting triphenyl phosphite with a fifty percent stoichiometric excess of tertiary octyl mercaptan in the presence of a sodium metal catalyst. The reactants were mixed in the equipment of Example 2, and held at a reflux for four hours. Distillation was started at thirteen millimeters Hg, the pot temperature varying from seventy-seven to one hundred and sixty-five degrees centigrade, and head temperature varying from thirty-six to sixty-two degrees centigrade. The distillate was pure tert. octyl mercaptan containing no phenol, which indicated no reaction. Two other attempts to complete this reaction also resulted in recovery of the starting materials. Thus, it can be seen that tertiary organo mercaptans cannot be employed in the instant novel transesterification reaction. The catalyst should preferably be a strong enough base to have a pH of at least about eleven in an 0.1 normal solution.

Analyses of the infrared spectra of the products produced in Examples 1 to 10 show that the thiophosphite products are substantially free of pentavalent phosphorus compounds such as thioates.

*Example 12.—Preparation of Trilauryltrithiophosphorothioate*

The apparatus employed in this example was a twelve-liter, three-necked flask provided with a thermometer, an agitator, a reflux condenser, a heating mantle, and means for feeding nitrogen into the flask at a point just above the liquid level. Sixty-eight hundred and thirty-seven grams (10.51 moles), of trilauryl trithiophosphite prepared as in Example 1, were added to the reaction flask along with 336.3 grams of sulfur (10.51 gram-atoms). The reactants were added to the flask with agitation, while heating the reactants to a temperature between about one hundred and nineteen and one hundred and twenty-four degrees centigrade for about seven and one-half hours. A nitrogen atmosphere was maintained in the reaction flask throughout the reaction. After this period the reaction mass was cooled to about room temperature and a filter aid was added in a proportion equivalent to about two percent by weight of the reaction mass. After adding the filter aid, the resulting slurry was filtered to yield a clarified liquid having a dark yellow color. Seven hundred and twenty-one grams of trilauryltrithiophosphorothioate were recovered as the clarified filtrate. This was equivalent to a recovery of about ninety-eight percent. The product had a refractive index of 1.5098 at twenty-five degrees centigrade. These compared with the theoretical refractive index of 1.5102 at twenty-five degrees centigrade, and a specific gravity of 0.946 at twenty-five degrees centigrade respectively. Chemical analysis of the product indicated a sulfur content of 18.3 percent, which compared favorably with the theoretical sulfur content 18.7 percent.

Example 12 illustrates the embodiment of the invention wherein the thiophites are reacted with sulfur to yield the corresponding thiophosphorothioates in high yield and purity. It is preferred to employ at least the stoichiometric proportion of sulfur necessary to form the thioate, but greater proportions may be employed if desired, since unreacted sulfur may be readily removed by filtration or other means after the reaction is complete.

It will be understood that various modifications within the invention are possible, some of which are referred to above. Therefore, I do not wish to be limited except as defined by the appended claims.

I claim:

1. A process for preparing a thiophosphite triester which comprises transesterifying at least one aryl radical of an aryl-substituted trivalent ester of phosphorous acid, said aryl radical being selected from the group consisting of phenyl, alkyl phenyl, halo phenyl and mixtures thereof, with an organo mercaptan having an organo radical selected from the group consisting of primary alkyl, secondary alkyl, lower alkenyl, cyclohexyl, benzyl, para nitrobenzyl, phenyl lower alkyl, furfuryl, and mixtures thereof, where said mercaptan is selected from the group consisting of monothiols and dithiols, said transesterification reaction being effected in the presence of a catalytic proportion of a basic inorganic catalyst.

2. A process for preparing a thiophosphite triester which comprises transesterifying at least one aryl radical of an aryl substituted trivalent ester of phosphorous acid, said aryl radical being selected from the group consisting of phenyl, alkyl phenyl, halo phenyl, and mixtures thereof, with an organo mercaptan having an organo radical selected from the group consisting of primary alkyl, secondary alkyl, lower alkenyl, cyclohexyl, benzyl, para nitrobenzyl, phenyl lower alkyl, furfuryl, and mixtures thereof, where said mercaptan is selected from the group consisting of monothiols and dithiols, said transesterification reaction being effected in the presence of a catalytic proportion of a basic catalyst selected from the group consisting of alkali metals, alkali metal hydrides, alkali metal sulphides, and mixtures thereof.

3. A process for preparing a diarylmonoaliphatic-monothiophosphite which comprises transesterifying a triarylphosphite wherein the aryl radical is selected from the group consisting of phenyl, alkyl phenyl, halo phenyl, and mixtures thereof with an aliphatic mercaptan wherein the aliphatic mercaptan is selected from the group consisting of alkyl monothiol, lower alkenyl monothiol, alkyl dithiol, lower alkenyl dithiol and mixtures thereof, in a proportion equivalent to at least about 0.8 mole of said mercaptan per mole of said phosphite, said transesterification reaction being effected in the presence of a catalytic proportion of a basic inorganic catalyst.

4. The process for preparing an O-aryldialiphatic-dithiophosphite which comprises transesterifying an O,O-diarylaliphaticmonothiophosphite wherein the aryl radical is selected from the group consisting of phenyl, alkyl phenyl, halo phenyl, and mixtures thereof, with an aliphatic mercaptan wherein the aliphatic mercaptan is selected from the group consisting of alkyl monothiol, lower alkenyl monothiol, alkyl dithiol, and lower alkenyl dithiol in a proportion equivalent to at least about 0.8 mole of said mercaptan per mole of said phosphite, said transesterification reaction being effected in the presence of a catalytic proportion of a basic inorganic catalyst.

5. The process for preparing an O-monoaryldialiphatic-dithiophosphite which comprises transesterifying a triarylphosphite wherein said aryl radical is selected from the group consisting of phenyl, alkyl phenyl, halo phenyl, and mixtures thereof, with an aliphatic mercaptan wherein the aliphatic mercaptan is selected from the group consisting of alkyl monothiol, lower alkenyl monothiol, alkyl dithiol, lower alkenyl dithiol and mixtures thereof, in a proportion equivalent to at least about 1.8 moles of said mercaptan per mole of said phosphite, said transesterification reaction being effected in the presence of a catalytic proportion of a basic inorganic catalyst.

6. The process for preparing a trialiphatictrithiophosphite which comprises transesterifying a triarylphosphite wherein the aryl radical is selected from the group consisting of phenyl, alkyl phenyl, halo phenyl, and mixtures thereof, with an aliphatic mercaptan wherein the aliphatic mercaptan is selected from the group consisting of alkyl monothiol, lower alkenyl monothiol, alkyl dithiol, and lower alkenyl dithiol, in a proportion equivalent to at least about 2.8 moles of said mercaptan per mole of said phosphite, said transesterification reaction being effected in the presence of a catalytic proportion of a basic inorganic catalyst.

7. The process for preparing a trialiphatictrithiophosphite which comprises transesterifying an O,O-diarylaliphaticmonothiophosphite wherein the aryl radical is selected from the group consisting of phenyl, alkyl phenyl, halo phenyl, and mixtures thereof, with an aliphatic mercaptan selected from the group consisting of alkyl monothiol, lower alkenyl monothiol, alkyl dithiol and lower alkenyl dithiol, in a proportion equivalent to at least about 1.8 moles of said mercaptan per mole of said phosphite, said transesterification reaction being effected in the presence of a catalytic proportion of a basic inorganic catalyst.

8. The process for preparing a trialiphatictrithiophosphite which comprises transesterifying an O-aryl dialiphatic dithiophosphite wherein the aryl radical is selected from the group consisting of phenyl, alkyl phenyl and halophenyl, with an aliphatic mercaptan selected from the group consisting of alkyl monothiol, lower alkenyl monothiol, alkyl dithiol, lower alkenyl dithiol and mixtures thereof in a proportion equivalent to at least about 0.8 mole of said mercaptan per mole of said phosphite, said transesterification reaction being effected in the presence of a catalytic proportion of a basic inorganic catalyst.

9. The process for preparing diphenylmonolauryl-monothiophosphite which comprises transesterifying triphenylphosphite with lauryl mercaptan in a molar proportion equivalent to at least about 0.8 mole of said mercaptan per mole of said phosphite, said transesterification reaction being effected in the presence of a catalytic proportion of a basic inorganic catalyst.

10. The process for preparing monophenyldilauryl-dithiophosphite which comprises transesterifying triphenylphosphite with lauryl mercaptan in a molar proportion equivalent to at least about 1.8 moles of said mercaptan per mole of said phosphite, said transesterification reaction being effected in the presence of a catalytic proportion of a basic inorganic catalyst.

11. The process for preparing trilauryltrithiophosphite which comprises transesterifying triphenylphosphite with lauryl mercaptan in a molar proportion of at least about 2.8 moles of said mercaptan per mole of said phosphite, said transesterification reaction being effected in the presence of a catalytic proportion of a basic catalyst.

12. The process of claim 11 wherein said basic catalyst is selected from the group consisting of alkali metals, alkali metal hydrides, alkali metal sulphides, and mixtures thereof.

13. The process of claim 11 wherein said basic catalyst is sodium.

14. The process of claim 11 wherein said basic catalyst is sodium hydride.

15. The process of claim 11 wherein said basic catalyst is sodium sulphide.

16. The process for preparing O-phenyl dibenzyl dithiophosphite which comprises transesterifying triphenyl phosphite with benzyl mercaptan in a molar proportion of at least about two moles of said mercaptan per mole of said phosphite, said transesterification being effected in the presence of a basic catalyst.

17. The process for preparing tribenzyltrithiophosphite which comprises transesterifying triphenyl phosphite with benzyl mercaptan in a molar proportion of at least about three moles of said mercaptan per mole of said phosphite, said transesterification being effected in the presence of a basic catalyst.

18. The process of claim 2 wherein the resulting organothiophosphite product is reacted with sulfur to yield an organothiophosphorothioate.

19. The process of claim 11 wherein the resulting trilauryltrithiophosphite product is reacted with sufficient sulfur to yield trilauryltrithiophosphorothioate.

References Cited in the file of this patent

UNITED STATES PATENTS

| | | |
|---|---|---|
| 2,353,558 | Gzemski | July 11, 1944 |
| 2,587,616 | Harman | Mar. 4, 1952 |

FOREIGN PATENTS

| | | |
|---|---|---|
| 207,985 | Australia | May 8, 1957 |

OTHER REFERENCES

J. Am. Chem. Soc., vol. 79, page 5326, 1957.